Patented Dec. 24, 1929

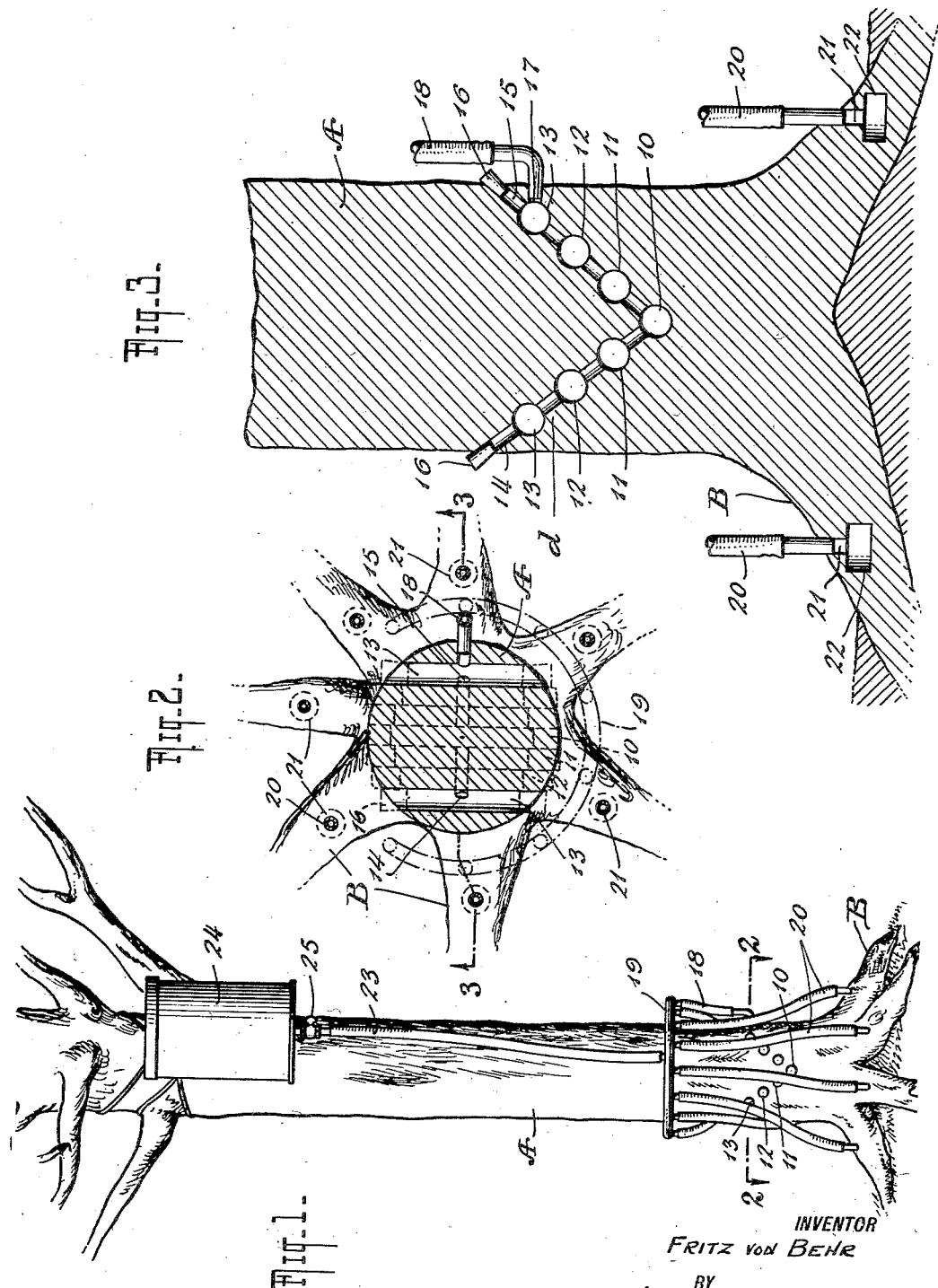

1,740,484

UNITED STATES PATENT OFFICE

FRITZ VON BEHR, OF USLAR IN SOLLING, HANOVER, GERMANY

IMPREGNATING PROCESS FOR DYEING OR PRESERVING WOOD

Application filed June 2, 1926. Serial No. 113,269.

My invention relates to impregnating processes and preparations for dyeing or preserving wood, and has particular reference to the treatment of living, standing trees. The object of my invention is to dye or preserve trees and the like while they are still living and rooted in the soil, and to effect the desired result in a relatively short time. For this purpose, I bore ducts or channels in a special novel way, set forth in detail hereinafter, into the trunk of the tree and preferably also into its roots; after plugging or otherwise closing the ends of any of these channels that may require such closing, I inject a dyeing or preserving liquid into the channels, and the sap rising in the tree will carry such liquid along so that after a certain time the liquid will reach and permeate all the parts of the tree. The tree is then felled and sawed in any well-known manner, and the timber, boards, veneer, or other products obtained therefrom will retain the dye or other treating substance permanently. Very striking and unusual effects are produced when a dye is used, the wood being tinted but still exhibiting the grain of the wood.

Reference is to be had to the accompanying drawings, in which Fig. 1 is an elevation of a tree bored according to my invention; Fig. 2 is a horizontal section on line 2—2 of Fig. 1 and Fig. 3 is a partial vertical section on line 3—3 of Fig. 2.

In carrying out my invention, I bore through the trunk A, near its bottom, a number of transverse preferably parallel and horizontal channels located at different levels and at different distances from the center of the trunk. In the preferred embodiment illustrated, there is a bottom channel 10 running through the center of the tree, and pairs of channels 11, 12, 13 located at successively higher levels, the members of successive pairs being at progressively increasing distances from each other. Thus, as will appear most clearly from Fig. 2, practically every sap-carrying duct of the trunk will be intersected by one of said transverse channels, which are arranged stepwise, with their projections in a horizontal plane contiguous as shown. These transverse channels communicate with each other, the simplest means for this purpose consisting in boring two inclined channels 14, 15 each having its lower end at the bottom transverse channel 10, while its upper end is at the outer surface of the trunk, at a level above the uppermost transverse channels 13. Plugs 16 are used for closing at the proper time, the ends of the several channels described above. In addition thereto, I provide a supply channel 17, leading to one of the uppermost channels 13. This supply channel is connected by a pipe 18 (preferably a flexible hose) with a manifold 19, the latter also having a number of similar connections 20 leading to channels 21 bored downwardly into roots B of the tree, the lower ends of said channels 21 being enlarged to form basins or chambers 22. Through a pipe 23, the manifold 19 receives a supply of treating liquid from a pail, tank or other suitable container 24.

After the several channels have been bored, and the channels 17 and 21 connected with the pipes 18 and 20 respectively of the manifold 19, the cock or valve 25 controlling the supply of treating liquid to the manifold is opened, allowing the said liquid to flow to all the channels and to become distributed in the trunk A and roots B. The ends of the channels 10, 11, 12, 13 are plugged before this flow is started, but the upper ends of the inclined channels 14, 15 are left open for awhile, to allow the escape of the air contained in the channels of the trunk. When the liquid begins to flow out at the upper ends of the channels 14, 15, thus indicating that the air has been expelled, said upper ends are closed by plugs 16. The several channels are made of a sufficient diameter to allow the air to escape readily. Preferably, as shown, the channels 10, 11, 12, and 13 are of greater diameter than the inclined or supply channels 14, 15, so that said wider channels will form basins or enlarged chanmbers. As shown in Fig. 2, the inclined supply channels 14, 15 connect with the channels 10, 11, 12, and 13 at the central portions of said horizontal or transverse channels, thereby insuring a more uniform distribution of the treating liquid.

The thickness $d$ of the wood left between channels 10, 11, 12, 13 is about an inch and a quarter in the preferred way of carrying out my invention. This, in connection with the stepwise arrangement of said channels, leaves the trunk of the tree strong enough to withstand even high winds, so as to prevent the tree from blowing down before it is ready for felling.

It will be noted from Fig. 3 that the particular arrangement of the channels produces a wedge-like formation in the trunk of the tree, that portion of the trunk which is above the channels terminating in a downwardly-tapering wedge located between two upwardly-tapering wedges on the lower or root portion of the trunk. This vertical overlapping of the upper and the lower trunk portions preserves a firm connection between said portions notwithstanding the cutting or drilling of the several channels described above. It will also be noted that the channels of one level (for instance, the channels 13) are separated from each other by a solid trunk portion of a width different from that of the solid trunk portion separating the channels (11 or 12) of the other levels.

The rising of the sap in the tree will distribute the treating liquid throughout the trunk and branches within a few hours, depending on the species of the tree and the activity of the sap flow at the time of the operation. The supply of the treating liquid directly to the roots B reduces considerably the time required for the distribution of said liquid throughout the tree and its branches. After a suitable length of time, the tree is felled and sawed in the usual manner, and the wood or other products obtained therefrom will contain the treating substance throughout their body. If a dye is employed, very ornamental effects may be obtained, and relatively common and therefore less valuable trees can be made to yield wood having the appearance of mahogany, walnut, and other expensive species. By employing a combination of dyes of different colors, very unusual and highly attractive effects may be produced.

When a tree is to be dyed according to my invention, I employ any aniline dye, or combination of aniline dyes, distributed in a solution containing about equal amounts (by weight) of alum, borax, zinc chloride, sodium perborate (powdered, containing 10% of oxygen), and acetic acid. For instance, about 175 grams of each of these five last-named ingredients (or 900 grams altogether) will be a suitable proportion, in some cases, for each cubic meter of wood to be treated, but it will be understood that amounts and proportions will vary according to the species and age of the tree.

When the purpose of the treatment is to preserve the wood, without dyeing it, I prefer to employ equal parts by weight (for instance 1½ kilograms for each cubic meter of wood) of calcium chloride, silicon sodium fluoride, campeche extract, and hydrogen peroxide (3% solution), all in water or other suitable menstruum. Again the species and age of the tree will govern the proportions and amounts to be employed. Some of the ingredients, for instance the campeche extract, may be omitted under certain circumstances.

Various modifications may be made without departing from the nature of my invention as set forth in the appended claims.

I claim:

1. The process which consists in forming channels in the roots and trunk of a living tree, the said root channels being enlarged at their lower ends to form basins, introducing a treating liquid into such channels and allowing such liquid to become distributed within the tree.

2. The process which consists in producing in the roots of a living tree, downwardly-extending channels enlarged at their lower ends, introducing a treating liquid into such channels and allowing such liquid to become distributed within the tree.

In testimony whereof I have hereunto set my hand.

FRITZ von BEHR.